(12) United States Patent
Hougland et al.

(10) Patent No.: US 10,015,240 B2
(45) Date of Patent: *Jul. 3, 2018

(54) METHOD AND SYSTEM FOR INTERFACE DATA UTILIZATION (71) Applicant: PAYPAL, INC., San Jose, CA (US)

(72) Inventors: Damon Charles Hougland, San Jose, CA (US); Jason Alexander Korosec, San Jose, CA (US); Osama Mostafa Bedier, San Jose, CA (US); Asim Razzaq, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 95 days.

This patent is subject to a terminal disclaimer.

(21) Appl. No.: 15/276,730

(22) Filed: Sep. 26, 2016

(65) Prior Publication Data
US 2017/0013048 A1  Jan. 12, 2017

Related U.S. Application Data

(63) Continuation of application No. 14/171,565, filed on Feb. 3, 2014, now Pat. No. 9,454,292, which is a
(Continued)

(51) Int. Cl.
*G06F 3/00* (2006.01)
*G06F 9/44* (2018.01)
(Continued)

(52) U.S. Cl.
CPC ............ *H04L 67/10* (2013.01); *G06F 3/0484* (2013.01); *G06F 13/387* (2013.01); *G06F 17/30864* (2013.01); *H04L 63/10* (2013.01)

(58) Field of Classification Search
None
See application file for complete search history.

(56) References Cited

U.S. PATENT DOCUMENTS 5,475,819 A   12/1995 Miller et al.
6,101,607 A    8/2000 Bachand et al.
(Continued)

OTHER PUBLICATIONS

"Facebook Developers Documentation", http://developers.facebook.com/documentation.php. (2007).
(Continued)

*Primary Examiner* — Craig Dorais
(74) *Attorney, Agent, or Firm* — Haynes & Boone, LLP (57) ABSTRACT

Methods and systems for interface data utilization are described. In one embodiment, a provider server may offer resources and an application server may offer functionality not provided by the resources of the provider server. A user request may be received through the source user interface. A determination may be made whether the user request contains a request to access a functionality that is not offered by the provider but is offered by an application that is communicatively coupled to the provider via a network. In response, an electronic communication may be established between the provider and the application via a network. A policy of the provider may be accessed from a first database, and interface definition data may be accessed from a second database different from the first database. Target interface data may be rendered based on the policy of the provider and the interface definition data.

20 Claims, 9 Drawing Sheets

Related U.S. Application Data continuation of application No. 12/129,492, filed on May 29, 2008, now Pat. No. 8,645,972.

(51) Int. Cl.
*G06F 9/46* (2006.01)
*G06F 13/00* (2006.01)
*H04L 29/08* (2006.01)
*G06F 13/38* (2006.01)
*G06F 3/0484* (2013.01)
*G06F 17/30* (2006.01)
*H04L 29/06* (2006.01)

(56) References Cited

U.S. PATENT DOCUMENTS

| | | |
|---|---|---|
| 6,988,241 B1 | 1/2006 | Guttman et al. |
| 7,296,219 B1 | 11/2007 | Guttman et al. |
| 7,328,435 B2 | 2/2008 | Trifon |
| 2004/0138896 A1 | 7/2004 | Cheng |
| 2005/0283455 A1 | 12/2005 | Kemmer et al. |
| 2006/0168512 A1 | 7/2006 | Wilson et al. |
| 2006/0288215 A1 | 12/2006 | Takemura et al. |
| 2007/0240037 A1 | 10/2007 | Law-How-Hung et al. |

OTHER PUBLICATIONS

"FBML—Facebook Developers Wiki", http://wiki.developers.facebook.com/index.php/FBML (Apr. 3, 2008).
"FQL—Facebook Developers Wiki", http://wiki.developers.facebook.com/index.php/FQL. (Feb. 4, 2008).

METHOD AND SYSTEM FOR INTERFACE DATA UTILIZATION

CROSS REFERENCE TO RELATED APPLICATIONS

This application is a continuation of Ser. No. 14/171,565, filed Feb. 3, 2014, which is a continuation of Ser. No. 12/129,492, filed May 29, 2008, which issued as U.S. Pat. No. 8,645,972, each of which is incorporated herein by reference in its entirety.

BACKGROUND

A provider of applications may seek to provide additional functionality to its users. Embedding applications that are not controlled by the provider may increase security risks associated with the user of the embedded applications. The provider may have little control over the output of the embedded applications. Applications provided to the provider by others for deployment may be difficult and expensive to manage.

BRIEF DESCRIPTION OF THE DRAWINGS

Some embodiments are illustrated by way of example and not limitation in the figures of the accompanying drawings in which.

DETAILED DESCRIPTION

Example methods and systems for interface data utilization are described. In the following description, for purposes of explanation, numerous specific details are set forth in order to provide a thorough understanding of example embodiments. It will be evident, however, to one skilled in the art that embodiments of the present invention may be practiced without these specific details.

In an example embodiment, source interface data may be provided from a provider. The source interface data may be capable of being used to provide a source user interface for a networked resource associated with the provider. A user request may be received through the source user interface. A service call may be provided over a network to an application based on the receiving of the user request. The application may be associated with an application manager. Response data may be received over the network from the application based on the service call. Target interface data may be rendered based on the response data. The target interface data may be provided from the provider.

In an example embodiment, application source data may be received over a network from an application. A policy of a provider may be accessed. Target interface data may be rendered based on the application source data and the policy of the provider. The target interface data may be capable of being used to provide a user interface for a networked resource associated with the provider. The target interface data may be provided from the provider.

In an example embodiment, an application may be configured to offer a service. Origination data including a service call to the service offered by the application may be received. The origination data may be provided to a provider. The provider may be capable of utilizing the origination data to provide interface data.

Figure 1:
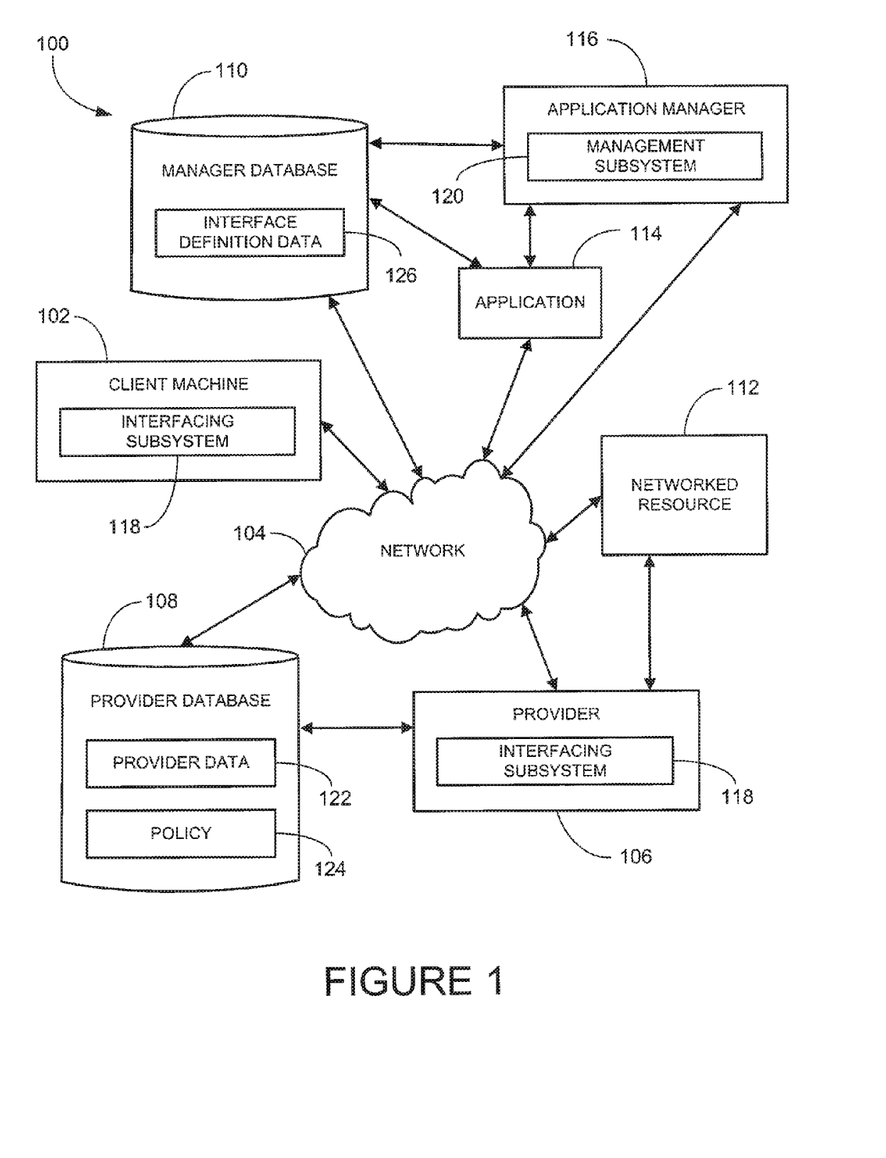
FIG. 1 is a block diagram of a system, according to example embodiments.

FIG. 1 illustrates an example system 100 in which a user operating a client machine 102 may communicate over a network 104 to access a networked resource 112 associated with a provider 106. The provider 106 may communicate with an application manager 116 to access functionality associated with an application 114.

Examples of the client machine 102 include a set-top box (STB), a receiver card, a mobile telephone, a personal digital assistant (PDA), a display device, a portable gaming unit, and a computing system; however other devices may also be used.

The network 104 over which the client machine 102, the provider 106, the networked resource 112, the application 114, and/or the application manager 116 are in communication may include a Global System for Mobile Communications (GSM) network, an Internet Protocol (IP) network, a Wireless Application Protocol (WAP) network, a WiFi network, or a IEEE 802.11 standards network as well as various combinations thereof. Other conventional and/or later developed wired and wireless networks may also be used.

The provider 106 may provide interface data to enable a user of the client machine 102 to access functionality associated with the networked resource 112. A user request may be received from the client machine 102 through the user interface. The provider 106 may then provide a service call over the network 104 to the application 114. The service call may be made, in an example embodiment, when the provider 106 does not have the functionality associated with the user request and the application 114 has the functionality. The application 114 may process the service call and provide response data to the provider 106 in response. The provider 106 may then render target interface data based on the response data and providing the target interface data to the client machine 102.

The provider 106 may use additional data to render the target interface data. For example, the provider 106 may obtain provider data 122 and/or a policy 124 from a provider database 108. The provider data 122 may include user information, additional functionality associated with the provider 106, or the like. The policy 124 may include, by way of example, a developer branding of the networked resource, a look and feel of the networked resource, a workflow of the networked source, or the like.

The application 114 may be, by way of example, a bookkeeping application, a tax calculation application, an invoicing application, a savings application (e.g., certificate of deposit), or a video advertising application. However, other applications which include functionality to be provided by the provider 106 may also be used. In an example embodiment, the provider 106 may utilize the functionality of the application 114 while controlling the interface data provided to the client 102.

The application manager 116 may access interface definition data 126 from a manager database 110 and use the interface definition data 126, in an example embodiment, in providing response data to the provider 106. The interface definition data 126 may include a user interface specification in user interface specification language.

Figure 2:
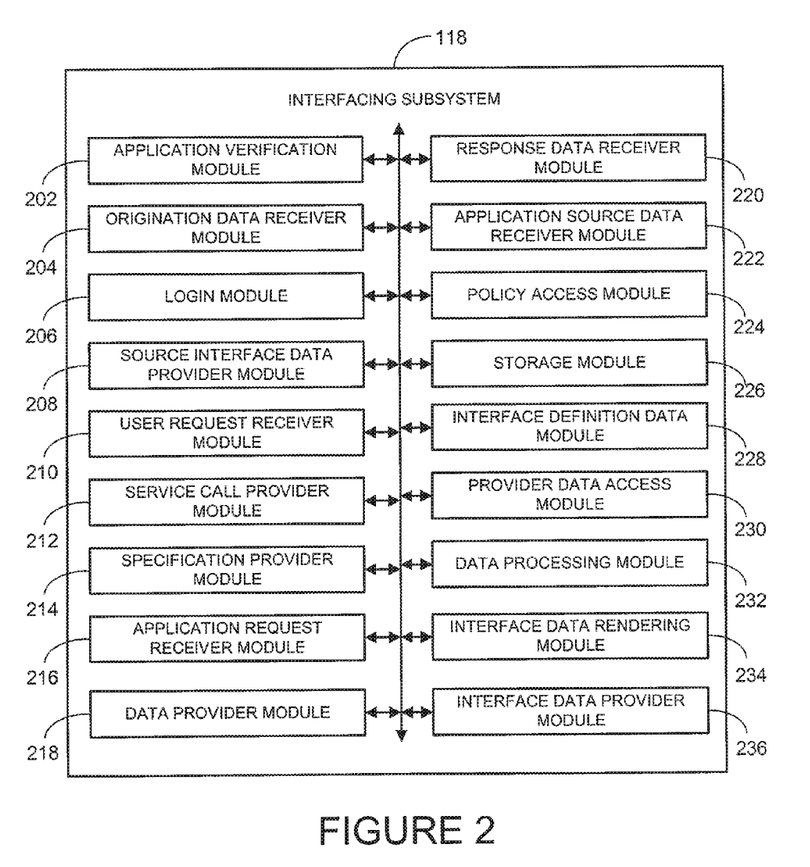
FIG. 2 is a block diagram of an example interfacing subsystem that may be deployed within the system of FIG. 1 according to an example embodiment.

FIG. 2 illustrates an example interfacing subsystem 118 that may be deployed in the client machine 102 and/or the provider 106 of the system 100 (see FIG. 1) or otherwise deployed in another system. The interfacing subsystem 118 may include an application verification module 202, an origination data receiver module 204, a login module 206, a source interface data provider module 208, a user request receiver module 210, a service call provider module 212, a specification provider module 214, an application request receiver module 216, a data provider module 218, a response data receiver module 220, an application source data receiver module 222, a policy access module 224, a storage module 226, an interface definition data module 228, a provider data access module 230, a data processing module 232, an interface data rendering module 234, and/or an interface data provider module 236. Other modules may also be included.

The application verification module 202 verifies the application 114. The origination data receiver module 204 receives origination data from the application 114. The login module 206 receives a login request and processes the login request.

The source interface data provider module 208 provides source interface data from the provider 106. The source interface data may be capable of being used to provide a source user interface for the networked resource 112 associated with the provider 106. The providing of the source interface data may be based on the processing of the login request. The source user interface may be a source web page or another type of interface.

The user request receiver module 210 receives a user request through with the source user interface. The receiving of the user request may be based on a service reference. The service call provider module 212 provides a service call over the network 104 to the application 114 based on the receiving of the user request.

The specification provider module 214 provides a response data specification and/or an application source data specification to the application manager 116. The application request receiver module 216 receives an application request over the network 104 from the application 114 based on the providing of the service call.

The data provider module 218 provides the provider data 122 from the provider 106 to the application 114 based on the receiving of the application request. The response data receiver module 220 receives response data over the network 104 from the application 114 based on the service call. The receiving of the response data may be based on the response data specification and/or responsive to the providing of the provider data 122.

The application source data receiver module 222 receives application source data over the network 104 from the application 114. The receiving of the application source data may be based on the application source data specification. The policy access module 224 accesses the policy 124 of the provider 106.

The storage module 226 stores at least a portion of the response data and/or the source data. The interface definition data module 228 receives the interface definition data 126 from the application manager 116, verifies the interface definition data 126, stores the interface definition data 126, and/or accesses the interface definition data 126 associated with the application 114.

The provider data access module 230 accesses the provider data 122 associated with the provider 106 (e.g., based on the user request). The data processing module 232 processes the response data and/or the application source data.

The interface data rendering module 234 renders target interface data based on the response data and/or the application source data and/or renders the source interface data based on the origination data.

The source interface data may include a service reference for the application 114. The rendering of the target interface data may be based on the response data, the provider data 122, the policy 124, the interface definition data 126, and/or the processing of the application source data.

The interface data provider module 236 provides the target interface data from the provider 106. The target interface data may be provided from the provider through an application programming interface (API) or otherwise provided.

Figure 3:
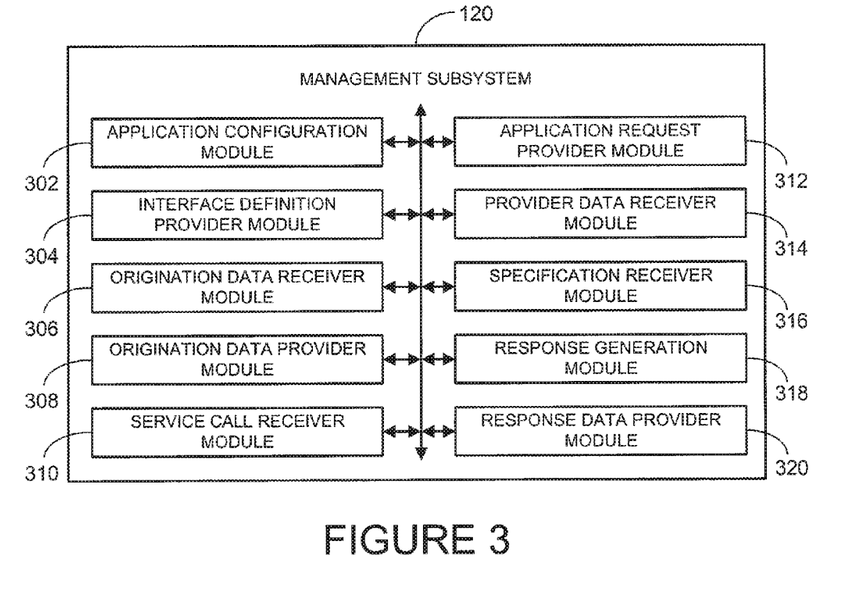
FIG. 3 is a block diagram of an example management subsystem that may be deployed within the system of FIG. 1 according to an example embodiment.

FIG. 3 illustrates an example management subsystem 120 that may be deployed in the application manager 116 of the system 100 (see FIG. 1) or otherwise deployed in another system. The management subsystem 120 may include an application configuration module 302, an interface definition provider module 304, an origination data receiver module 306, an origination data provider module 308, a service call receiver module 310, an application request provider module 312, a provider data receiver module 314, a specification receiver module 316, a response generation module 318, and/or a response data provider module 320. Other modules may also be included.

The application configuration module 302 configures the application 114 to offer a service. The interface definition provider module 304 provides interface definition data to the provider 106.

The origination data receiver module 306 receives origination data including a service call to the service offered by the application 114. The origination data provider module 308 provides the origination data to the provider 106. The provider 106 may be capable of utilizing the origination data to provide interface data.

The service call receiver module 310 receives a service call over the network 104 based on the providing of the origination data. The application request provider module 312 provides an application request over the network 104 to the provider 106 based on the receiving of the service call.

The provider data receiver module 314 receives provider data from the provider 106 based on the providing of the application request. The specification receiver module 316 receives a response data specification from the provider 106.

The response generation module 318 generates response data from the application 114 based on the service call, the provider data, and/or on the specification. The response data provider module 320 provides the response data over the network 104 to the provider 106.

Figure 4:
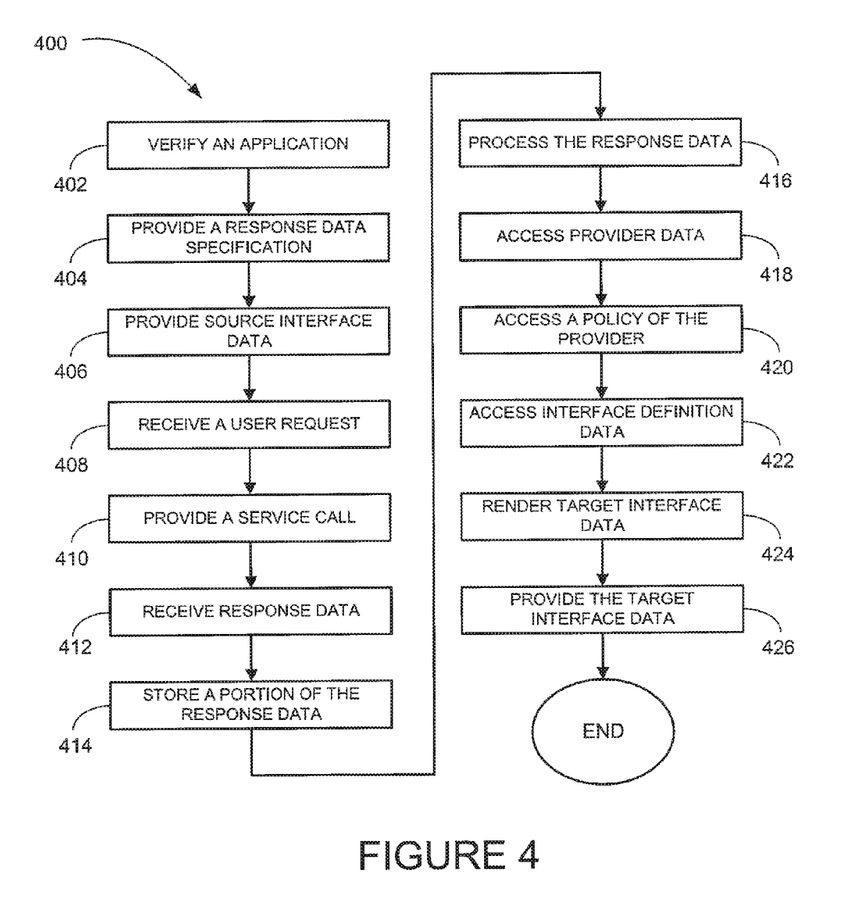
FIGS. 4 and 5 are example flowcharts illustrating a method for interface data rendering according to example embodiments.

FIG. 4 illustrates a method 400 for interface data rendering according to an example embodiment. The method 400 may be performed by the client machine 102 and/or the provider 106 of the system 100 (see FIG. 1) or otherwise performed.

In an example embodiment, the method 400 may be used to enable the provider 106 to offer functionality beyond its own capabilities or specialization. This additional functionality may be provided from the application 114 or a service within the application 114. Providing the additional functionality to users in this leveraged manner may increase the value and relevance of the provider 106.

The application 114 may be verified at block 402. The verification may include a security check, validating the application 114, and the like. A response data specification may be provided to the application manager 116 at block 404.

Source interface data is provided from the provider 106 at block 406. The source interface data may be capable of being used to provide a source user interface for the networked resource 112 associated with the provider 106. The source user interface may be a source web page, a programmable interface, or a different type of interface In an example embodiment, a login request may be received and the login request may be processed prior to the providing of the source interface data.

In an example embodiment, origination data may be received from the application and the source interface data provided during the operations at block 406 may be rendered based on the origination data. The source interface data may include a service reference for the application 114.

A user request is received through with the source user interface at block 408. The receiving of the user request may be based on the service reference.

At block 410, a service call is provided over the network 104 to the application 114 based on receipt of the user request.

Response data is received over the network 104 from the application 114 based on the service call at block 412. The receiving of the response data may be based on the response data specification.

In an example embodiment, an application request may be received over the network 104 from the application 114 based on the providing of the service call and the provider data 122 may be provided from the provider 106 to the application 114 based on the receiving of the application request. The response data may be received during the operations performed at block 412 responsive to the providing of the provider data.

At least a portion of the response data may be stored at block 414. The response data may be processed at block 416. The provider data 122 associated with the provider 106 may be accessed based on the user request at block 418.

The policy 124 of the provider 106 may be accessed at block 420. The policy 124 may include, by way of example, a developer branding of the networked resource, a look and feel of the networked resource, a workflow of the networked source, or the like.

The interface definition data 126 associated with the application 114 may be accessed at block 422. The interface definition data 126 may include, in an example embodiment, a user interface specification in user interface specification language.

In an example embodiment, the interface definition data 126 may be received from the application manager 116, the interface definition data may be verified (e.g., citified; identification of security holes, and the like), and the interface definition data 126 may be stored. The accessing of the interface definition data 126 during the operations at block 422 may be based on the storing of the interface definition data 126.

The target interface data is rendered based on the response data, the provider data 122, the policy 124, and/or, and/or the interface definition data 126 at block 424. The rendering may include, by way of example, translation and/or conversion of the response data. The target interface data may be capable of being used to provide a target user interface for the networked resource 112.

The target interface data is provided from the provider 106 at block 426. The target interface data may be provided from the provider 106 through an application programming interface (API) or may be otherwise provided.

Figure 5:
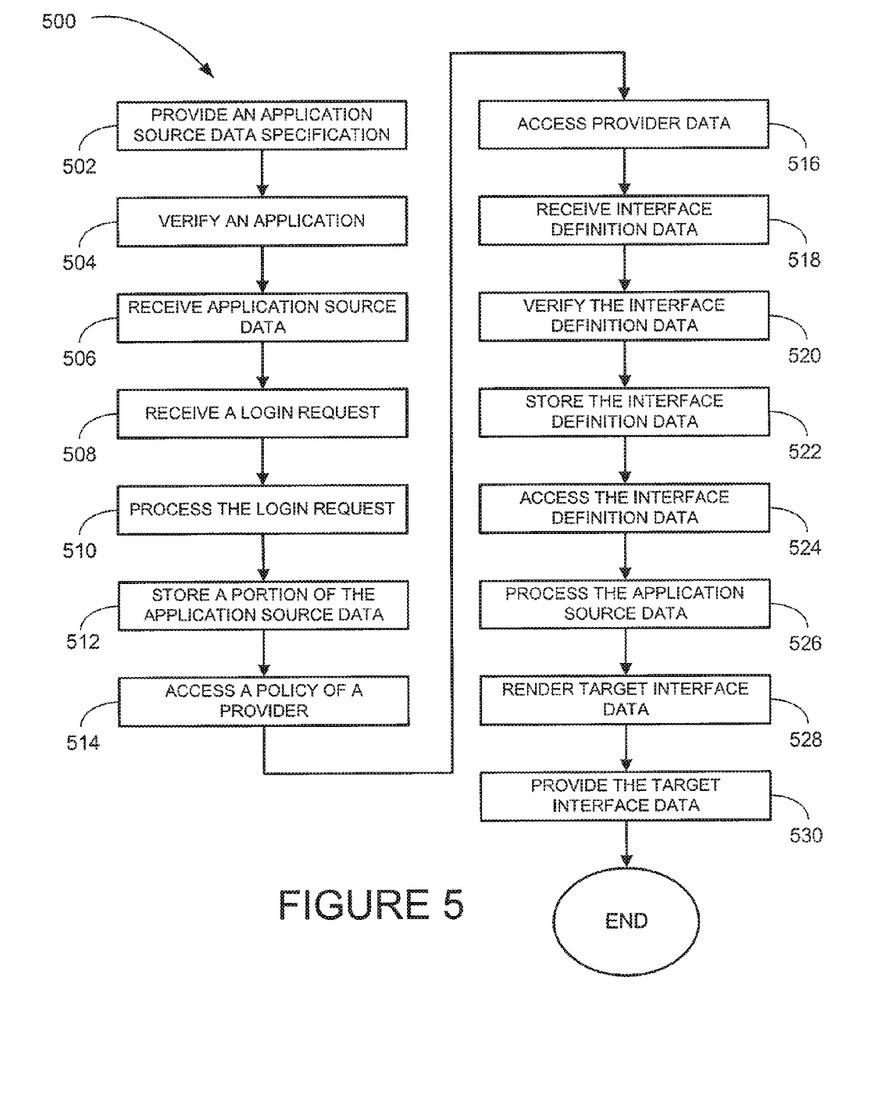

FIG. 5 illustrates a method 500 for interface data rendering according to an example embodiment. The method 500 may be performed by the client machine 102 and/or the provider 106 of the system 100 (see FIG. 1) or otherwise performed.

In an example embodiment, the method 500 may be used to enable the provider 106 to offer functionality beyond its own capabilities or specialization. This additional functionality may be provided from the application 114 or a service within the application 114. Providing the additional functionality to users in this leveraged manner may increase the value and relevance of the provider 106.

An application source data specification may be provided to the application manager 116 at block 502. The application manager 116 may be associated with the application 114. The application 114 may be verified at block 504.

Application source data is received over the network 104 from the application 114 at block 506. The receiving of the application source data may be based on the application source data specification.

A login request may be received at block 508. The login request may be processed at block 510. At least a portion of the application source data may be stored at block 512.

The policy 124 of the provider 106 is accessed (e.g., from the provider database 108) at block 514. The provider data 122 associated with the provider 106 may be accessed at block 516. The interface definition data 126 may be received from the application manager 116 at block 518.

The interface definition data 126 may be verified at block 520. The verification may include certifying the interface definition data 126, identifying security holes in the interface definition data 126, or the like.

The interface definition data 126 may be stored at block 522. The storing of the interface definition data 126 may be based on verification of the interface definition data.

The interface definition data 126 associated with the application 114 may be accessed at block 524. The interface definition data 126 may include a user interface specification in user interface specification language. The accessing of the interface definition data 126 may be based on storage of the interface definition data 126. The application source data may be processed at block 526.

At block 528, target interface data is rendered based on the application source data, the response data, the provider data 122, the policy 124, and/or interface definition data 126 of the provider 106. The target interface data may be capable of being used to provide a user interface for the networked resource 112 associated with the provider 106.

The target interface data may be provided from the provider at block 530. The target interface data may be provided from the provider through an application programming interface (API) or otherwise provided. The providing of the target interface data may be based on the processing of the login request.

Figure 6:
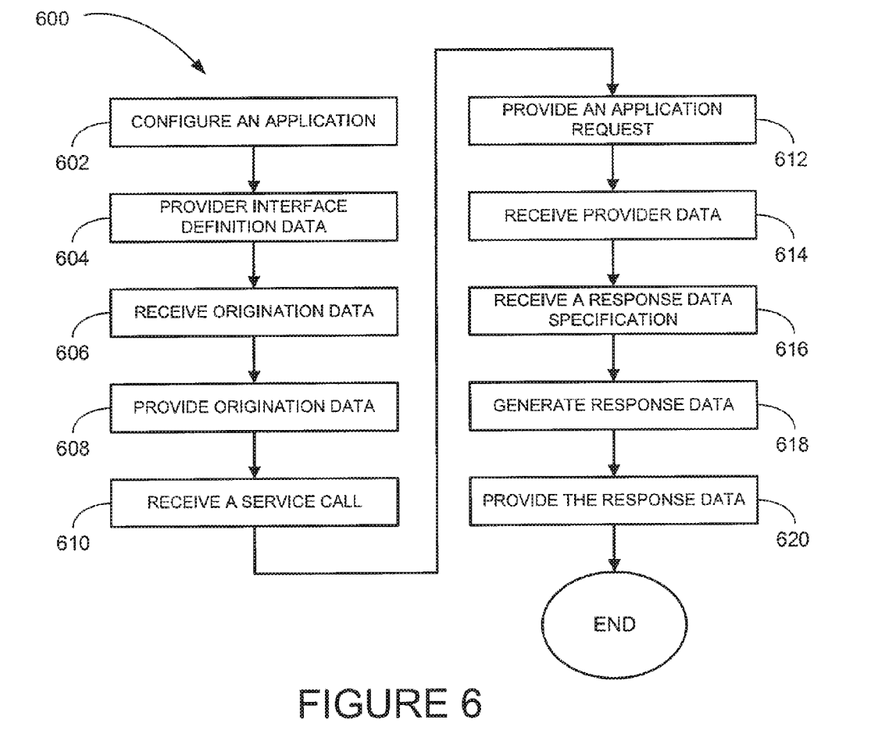
FIG. 6 is an example flowchart illustrating a method for origination data utilization according to example embodiments.

FIG. 6 illustrates a method 600 for origination data utilization according to an example embodiment. The method 600 may be performed by the application manager 116 of the system 100 (see FIG. 1) or otherwise performed.

The application 114 is configured to offer a service at block 602. The Interface definition data 126 may be provided to the provider 106 at block 604.

Origination data including a service call to the service offered by the application 114 is received at block 606. The origination data is provided to the provider 106 at block 608. The provider 106 may be capable of utilizing the origination data to provide interface data.

At block 610, a service call may be received over the network 104 based on the providing of the origination data. An application request may be provided over the network 104 to the provider 106 based on the receiving of the service call at block 612. The provider data 122 may be received from the provider 106 based on the providing of the application request at block 614.

A response data specification may be received from the provider 106 at block 616. Response data may be generated from the application 114 based on the service call at block 618. The generation of the response data may be based on the service call and the provider data. The generation of the response data may be based on the response data specification.

The response data may be provided over the network 104 to the provider 106 at block 620.

Figure 7:
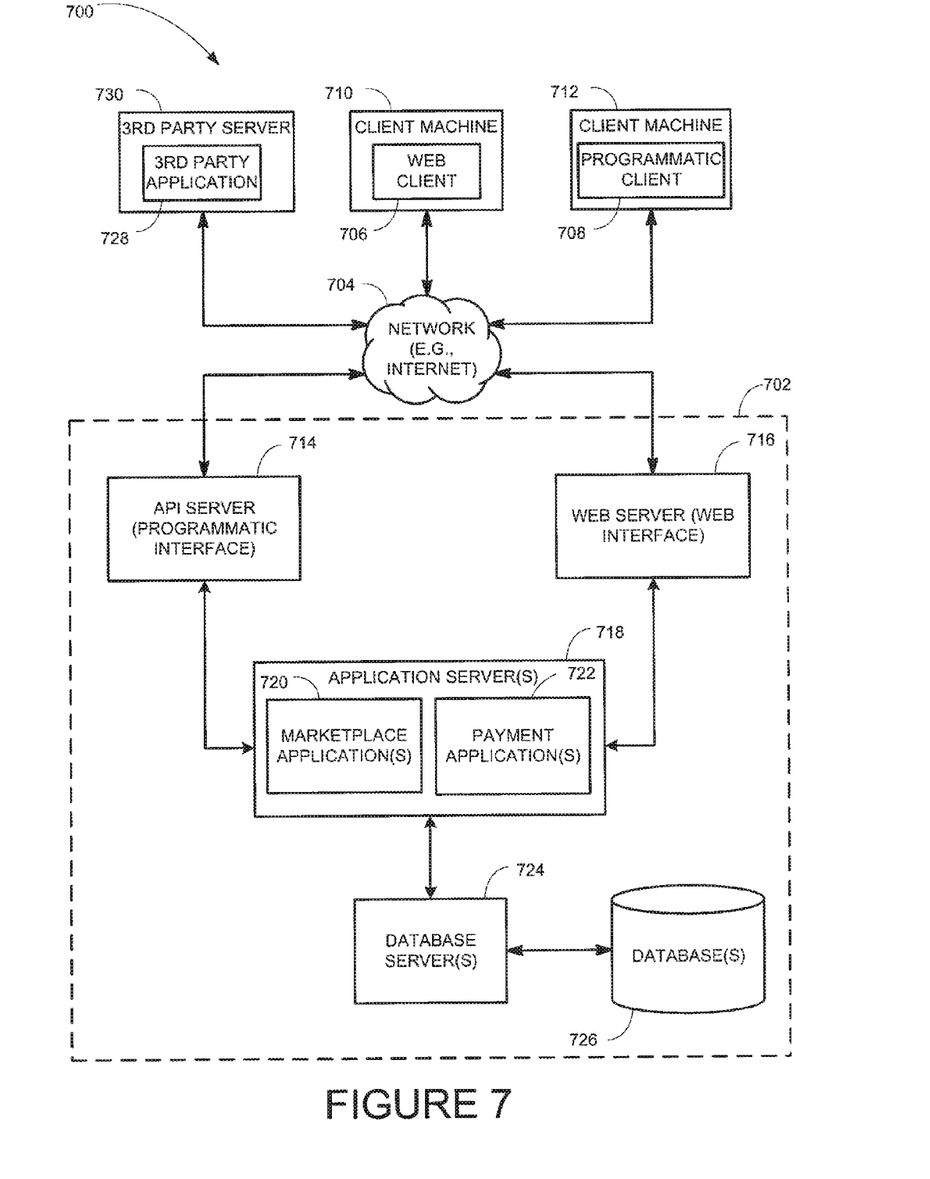
FIG. 7 is a network diagram depicting a network system, according to one embodiment, having a client server architecture configured for exchanging data over a network.

FIG. 7 is a network diagram depicting a client-server system 700, within which one example embodiment may be deployed. By way of example, a network 704 may include the functionality of the network 104, the provider 106 and/or the application manager 116 may be deployed within an application server 718, and the client machine 102 may include the functionality of a client machine 710 or a client machine 712. The system 700 may also be deployed in other systems.

A networked system 702, in the example forms of a network-based marketplace or publication system, provides server-side functionality, via a network 704 (e.g., the Internet or Wide Area Network (WAN)) to one or more clients. FIG. 7 illustrates, for example, a web client 706 (e.g., a browser, such as the Internet Explorer browser developed by Microsoft Corporation of Redmond, Wash. State), and a programmatic client 708 executing on respective client machines 710 and 712.

An Application Program Interface (API) server 714 and a web server 716 are coupled to, and provide programmatic and web interfaces respectively to, one or more application servers 718. The application servers 718 host one or more marketplace applications 720 and authentication providers 722. The application servers 718 are, in turn, shown to be coupled to one or more databases servers 724 that facilitate access to one or more databases 726.

The marketplace applications 720 may provide a number of marketplace functions and services to users that access the networked system 702. The authentication providers 722 may likewise provide a number of payment services and functions to users. The authentication providers 722 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 720.

While the marketplace and authentication providers 720 and 722 are shown in FIG. 7 to both form part of the networked system 702, in alternative embodiments the authentication providers 722 may form part of a payment service that is separate and distinct from the networked system 702.

Further, while the system 700 shown in FIG. 7 employs a client-server architecture, embodiments of the present invention are of course not limited to such an architecture, and could equally well find application in a distributed, or peer-to-peer, architecture system, for example. The various marketplace and authentication providers 720 and 722 could also be implemented as standalone software programs, which need not have networking capabilities.

The web client 706 accesses the various marketplace and authentication providers 720 and 722 via the web interface supported by the web server 716. Similarly, the programmatic client 708 accesses the various services and functions provided by the marketplace and authentication providers 720 and 722 via the programmatic interface provided by the API server 714. The programmatic client 708 may, for example, be a seller application (e.g., the TurboLister™ application developed by eBay Inc., of San Jose, Calif.) to enable sellers to author and manage listings on the networked system 702 in an off-line manner, and to perform batch-mode communications between the programmatic client 708 and the networked system 702.

FIG. 7 also illustrates a third party application 728, executing on a third party server machine 730, as having programmatic access to the networked system 702 via the programmatic interface provided by the API server 714. For example, the third party application 728 may, utilizing information retrieved from the networked system 702, support one or more features or functions on a website hosted by the third party. The third party may, for example, provide one or more promotional, marketplace or payment functions that are supported by the relevant applications of the networked system 702. The programmatic client 728 may, for example, be a lending application to enable buyers and sellers to access third party sources of funds, such as www.samedaycash.com, provided by Wonga.com of London, England. The programmatic client 728 may be any third party application (e.g., accounting, tax calculation, lending, invoicing, savings, among others) that is offered through system 702.

Figure 8:
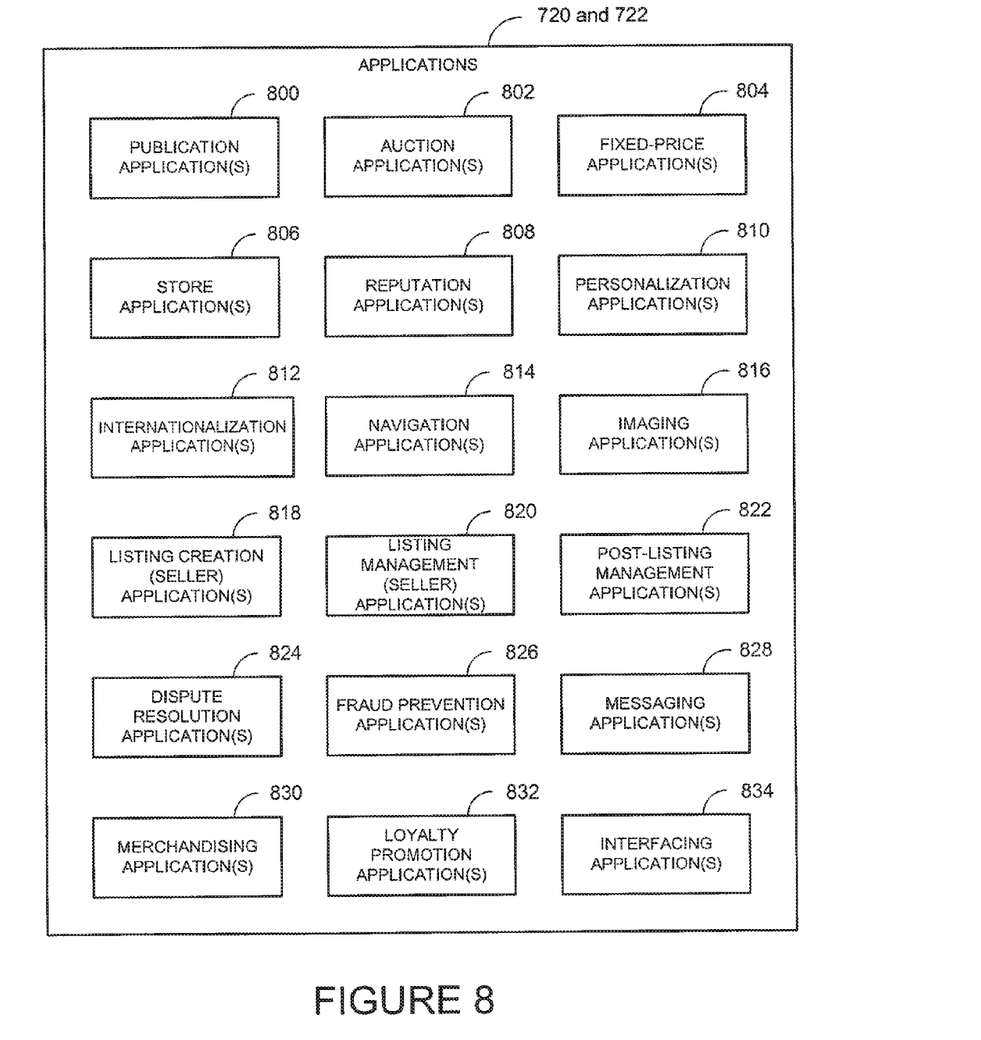
FIG. 8 is a block diagram illustrating an example embodiment of multiple network and marketplace applications, which are provided as part of the network-based marketplace.

FIG. 8 is a block diagram illustrating multiple applications 720 and 722 that, in one example embodiment, are provided as part of the networked system 702 (see FIG. 7). The applications 720 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 726 via the database servers 724.

The networked system 702 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 720 are shown to include at least one publication application 800 and one or more auction applications 802 which support auction-format listing and price setting mechanisms (e.g., English, Dutch, Vickrey, Chinese, Double, Reverse auctions etc.). The various auction applications 802 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 804 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 806 allow a seller to group listings within a "virtual" store, which may be branded and otherwise personalized by and for the seller. Such a virtual store may also offer promotions, incentives and features that are specific and personalized to a relevant seller.

Reputation applications 808 allow users that transact, utilizing the networked system 702, to establish, build and maintain reputations, which may be made available and published to potential trading partners. Consider that where, for example, the networked system 702 supports person-to-person trading, users may otherwise have no history or other reference information whereby the trustworthiness and credibility of potential trading partners may be assessed. The reputation applications 808 allow a user, for example through feedback provided by other transaction partners, to establish a reputation within the networked system 702 over time. Other potential trading partners may then reference such a reputation for the purposes of assessing credibility and trustworthiness.

Personalization applications 810 allow users of the networked system 702 to personalize various aspects of their interactions with the networked system 702. For example a user may, utilizing an appropriate personalization application 810, create a personalized reference page at which information regarding transactions to which the user is (or has been) a party may be viewed. Further, a personalization application 810 may enable a user to personalize listings and other aspects of their interactions with the networked system 702 and other parties.

The networked system 702 may support a number of marketplaces that are customized, for example, for specific geographic regions. A version of the networked system 702 may be customized for the United Kingdom, whereas another version of the networked system 702 may be customized for the United States. Each of these versions may operate as an independent marketplace, or may be customized (or internationalized and/or localized) presentations of a common underlying marketplace. The networked system 702 may accordingly include a number of internationalization applications 812 that customize information (and/or the presentation of information) by the networked system 702 according to predetermined criteria (e.g., geographic, demographic or marketplace criteria). For example, the internationalization applications 812 may be used to support the customization of information for a number of regional websites that are operated by the networked system 702 and that are accessible via respective web servers 716.

Navigation of the networked system 702 may be facilitated by one or more navigation applications 814. For example, a search application (as an example of a navigation application) may enable key word searches of listings published via the networked system 702. A browse application may allow users to browse various category, catalogue, or system inventory structures according to which listings may be classified within the networked system 702. Various other navigation applications may be provided to supplement the search and browsing applications.

In order to make listings available via the networked system 702 as visually informing and attractive as possible, the marketplace applications 720 may include one or more imaging applications 816 utilizing which users may upload images for inclusion within listings. An imaging application 816 also operates to incorporate images within viewed listings. The imaging applications 816 may also support one or more promotional features, such as image galleries that are presented to potential buyers. For example, sellers may pay an additional fee to have an image included within a gallery of images for promoted items.

Listing creation applications 818 allow sellers conveniently to author listings pertaining to goods or services that they wish to transact via the networked system 702, and listing management applications 800 allow sellers to manage such listings. Specifically, where a particular seller has authored and/or published a large number of listings, the management of such listings may present a challenge. The listing management applications 800 provide a number of features (e.g., auto-relisting, inventory level monitors, etc.) to assist the seller in managing such listings. One or more post-listing management applications 802 also assist sellers with a number of activities that typically occur post-listing. For example, upon completion of an auction facilitated by one or more auction applications 702, a seller may wish to leave feedback regarding a particular buyer. To this end, a post-listing management application 802 may provide an interface to one or more reputation applications 808, so as to allow the seller conveniently to provide feedback regarding multiple buyers to the reputation applications 808.

Dispute resolution applications 814 provide mechanisms whereby disputes arising between transacting parties may be resolved. For example, the dispute resolution applications 814 may provide guided procedures whereby the parties are guided through a number of steps in an attempt to settle a dispute. In the event that the dispute cannot be settled via the guided procedures, the dispute may be escalated to a merchant mediator or arbitrator.

A number of fraud prevention applications 826 implement fraud detection and prevention mechanisms to reduce the occurrence of fraud within the networked system 702.

Messaging applications 828 are responsible for the generation and delivery of messages to users of the networked system 702, such messages for example advising users regarding the status of listings at the networked system 702 (e.g., providing "outbid" notices to bidders during an auction process or to provide promotional and merchandising information to users). Respective messaging applications 828 may utilize any one have a number of message delivery networks and platforms to deliver messages to users. For example, messaging applications 828 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 830 support various merchandising functions that are made available to sellers to enable sellers to increase sales via the networked system 702. The merchandising applications 830 also operate the various merchandising features that may be invoked by sellers, and may monitor and track the success of merchandising strategies employed by sellers.

The networked system 702 itself, or one or more parties that transact via the networked system 702, may operate loyalty programs that are supported by one or more loyalty/promotions applications 832. For example, a buyer may earn loyalty or promotions points for each transaction established and/or concluded with a particular seller, and may be offered a reward for which accumulated loyalty points can be redeemed.

Interfacing applications 834 may enable functionality from one or more applications 114 not deployed on the application 720, 722 to be available to a user. For example, the application 114 may used in place of one of the applications 800-832, may supplement the functionality of the applications 800-832, or provide additional functionality not provided by the applications 800-832.

Figure 9:
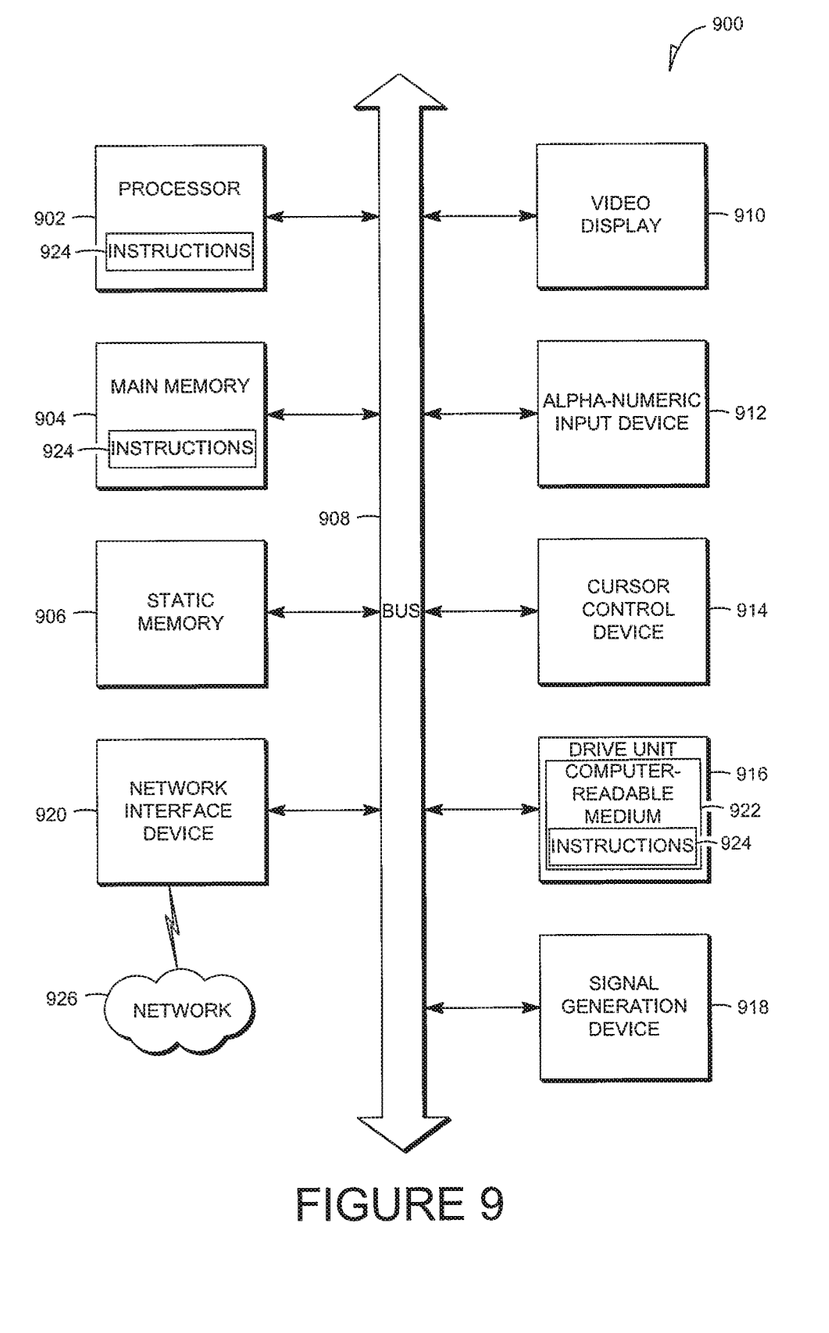
FIG. 9 is a block diagram diagrammatic representation of machine in the example form of a computer system within which a set of instructions for causing the machine to perform any one or more of the methodologies discussed herein may be executed.

FIG. 9 shows a diagrammatic representation of machine in the example form of a computer system 900 within which a set of instructions may be executed causing the machine to perform any one or more of the methods, processes, operations, or methodologies discussed herein. The provider 106, the application manager 116, and/or the application 114 may operate on or more computer systems 900. The client machine 102 may include the functionality of one or more computer systems 900.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU) a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a cursor control device 914 (e.g., a mouse), a drive unit 916, a signal generation device 918 (e.g., a speaker) and a network interface device 920.

The drive unit 916 includes a machine-readable medium 922 on which is stored one or more sets of instructions (e.g., software 924) embodying any one or more of the methodologies or functions described herein. The software 924 may also reside, completely or at least partially, within the main memory 904 and/or within the processor 902 during execution thereof by the computer system 900, the main memory 904 and the processor 902 also constituting machine-readable media.

The software 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the embodiments of the present invention. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Thus, methods and systems for interface data utilization have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   a provider server offering resources;
   an application server external to the provider server, the application server offering a functionality not provided by the resources of the provider server;
   a first database containing a policy of the provider server; and
   a second database containing interface definition data;
   wherein the provider server is communicatively coupled to the application server, the first database, and the second database, and is configured to:
   receive, from a client machine, a user request to access a networked resource;

determine that the user request contains a request to access the functionality not offered by the provider server;

make a service call to the application server;

receive response data from the application server;

access the policy of the provider server from the first database;

access the interface definition data from the second database; and render target interface data based on the policy of the provider server and the interface definition data.

2. The system of claim 1, wherein the policy includes a developer branding of the networked resource.

3. The system of claim 1, wherein the interface definition data includes a user interface specification in a user interface specification language.

4. The system of claim 1, wherein the rendered target interface data is further based on response data received from the application server in response to the service call.

5. The system of claim 1, wherein the provider server is further configured to provide the target interface data to the client machine.

6. The system of claim 1 wherein the interface definition data defines a user interface for the networked resource associated with the provider.

7. The system of claim 1, wherein the service call contains an application request.

8. The system of claim 1, wherein the provider server is further configured to verify the interface definition data by certifying the interface definition data or identifying security holes in the interface definition data.

9. The system of claim 1, wherein the provider server is further configured to receive origination data from the application server;

wherein the target interface data is further rendered based on the origination data; and wherein the target interface data contains a service reference for the application.

10. A method comprising:

receiving, from a client machine, a user request to access a networked resource associated with a provider;

determining that the request contains a request to access a functionality that is not offered by the provider but is offered by an application that is communicatively coupled to the provider via a network;

establishing, in response to the determining, electronic communication between the provider and the application via the network;

accessing a policy of the provider from a first database;

accessing interface definition data from a second database different from the first database; and rendering target interface data based on the policy of the provider and the interface definition data.

11. The method of claim 10 wherein the policy include a developer branding of the networked resource.

12. The method of claim 10 wherein the interface definition data includes a user interface specification in user interface specification language.

13. The method of claim 10 wherein the rendering the target interface data is performed base further on the established communication between the provider and the application.

14. The method of claim 10 further comprising providing the target interface data to the client machine.

15. The method of claim 10 wherein the interface definition data defines a user interface for the networked resource associated with the provider.

16. The method of claim 10, further comprising verifying the interface definition data.

17. The method of claim 16 wherein verifying the interface definition data comprises certifying the interface definition data or identifying security holes in the interface definition data.

18. The method of claim 10 further comprising exchanging origination data associated with the application.

19. The method of claim 18 wherein the target interface data is further rendered based on the origination data.

20. The method of claim 19 wherein the target interface data contains a service reference for the application.

* * * * *